United States Patent
Axakov et al.

(10) Patent No.: US 9,055,820 B2
(45) Date of Patent: Jun. 16, 2015

(54) AIR MANIFOLD FOR VENTILATED SEAT OR BED

(75) Inventors: Dmitri Axakov, Windsor (CA); Raghvendra Joshi, Windsor (CA)

(73) Assignee: IGB Automotive Ltd., Ontario (CA)

( * ) Notice: Subject to any disclaimer, the term of this patent is extended or adjusted under 35 U.S.C. 154(b) by 700 days.

(21) Appl. No.: 12/909,091

(22) Filed: Oct. 21, 2010

(65) Prior Publication Data

US 2011/0109128 A1     May 12, 2011

Related U.S. Application Data

(60) Provisional application No. 61/260,548, filed on Nov. 12, 2009.

(51) Int. Cl.
   A47C 7/74      (2006.01)
   B60N 2/56      (2006.01)
   A47C 21/04     (2006.01)

(52) U.S. Cl.
   CPC ............... *A47C 7/744* (2013.01); *A47C 21/044* (2013.01); *B60N 2/5642* (2013.01)

(58) Field of Classification Search
   CPC .......... A47C 7/744; A47C 7/74; B60N 2/565; B60N 2/5657; B60N 2/5642; B60N 2/5635
   USPC ............... 297/180.13, 180.14, 452.47; 5/423, 5/652.2, 724, 726
   See application file for complete search history.

(56) References Cited

U.S. PATENT DOCUMENTS

| | | | |
|---|---|---|---|
| 3,030,145 A * | 4/1962 | Kottemann | 297/180.11 |
| 3,895,841 A * | 7/1975 | Lebert | 297/464 |
| 3,940,183 A * | 2/1976 | Seltzer et al. | 297/452.45 |
| 5,403,065 A * | 4/1995 | Callerio | 297/180.11 |
| 5,645,314 A * | 7/1997 | Liou | 297/180.14 |
| 5,692,952 A * | 12/1997 | Chih-Hung | 454/120 |
| 5,740,573 A * | 4/1998 | Boyd | 5/711 |
| 6,068,332 A * | 5/2000 | Faust et al. | 297/180.13 |
| 6,108,844 A * | 8/2000 | Kraft et al. | 5/732 |
| 6,478,369 B1 * | 11/2002 | Aoki et al. | 297/180.13 |
| 6,493,889 B2 * | 12/2002 | Kocurek | 5/423 |
| 6,685,553 B2 * | 2/2004 | Aoki | 454/120 |
| 7,100,978 B2 * | 9/2006 | Ekern et al. | 297/180.11 |
| 7,229,129 B2 * | 6/2007 | White et al. | 297/180.12 |
| 7,238,101 B2 * | 7/2007 | Kadle et al. | 454/120 |
| 7,644,983 B2 * | 1/2010 | Wolfe et al. | 297/180.15 |
| 2008/0211269 A1 * | 9/2008 | Iqbal et al. | 297/180.14 |
| 2009/0229785 A1 * | 9/2009 | Kadle et al. | 165/42 |
| 2010/0295339 A1 * | 11/2010 | Siu | 297/180.14 |

* cited by examiner

*Primary Examiner* — David R Dunn
*Assistant Examiner* — Tania Abraham
(74) *Attorney, Agent, or Firm* — Fildes & Outland, P.C.

(57) ABSTRACT

An air manifold includes a sheet-like body including first and second spaced, opposing walls and a sealed perimeter. A plurality of divider walls connects the first and second walls together and defines a plurality of air channels within the body. An opening in the body defines an air port cooperable with an air mover. The air port is in fluid communication with the air channels. At least one zone inside the body is free of the divider walls. A group of the air channels are in fluid communication with each other through one the zone. A plurality of air vents located in the first wall are in fluid communication with at least one of the air channels. The air manifold is disposable between a seat cushion element and a structural support of a seat. The first wall of the air manifold faces a backside surface of the seat cushion element.

13 Claims, 17 Drawing Sheets

AIR MANIFOLD FOR VENTILATED SEAT OR BED

CROSS REFERENCE TO RELATED APPLICATION

This application claims the priority of U.S. Provisional Application No. 61/260,548 filed Nov. 12, 2009.

TECHNICAL FIELD

This invention relates to the field of comfort systems for occupant supports, and more particularly to an air manifold for vehicular and non-vehicular seating and bedding.

BACKGROUND OF THE INVENTION

Conventional ventilated seats include a seat trim cover made of fabric or leather on which a seat occupant's body contacts, and an air permeable layer located under the seat cover. The air permeable layer rests on a cushioning element, for example a bun of polyurethane foam, coconut fiber, cotton mat, etc. An air manifold conducts air flow into or out of the air permeable layer or the whole cushioning element. In such seats, the source of the air pressure or partial vacuum (fan, blower, seat air conditioning unit or a ducting from a vehicular air conditioning unit) is connected to the seat internal manifold.

The cushioning element of the seat is typically supported by a seat structure including a frame that may be stationary or flexing. Examples of the supporting structure include steel springs, plywood sheeting, a "seat pan" (in automotive seats), and other structural materials.

One technical difficulty in the field of ventilated seats is the structure and arrangement of the manifold for delivery and/or exhaust of air to and from the air permeable elements of the seat.

Conventional air manifolds may be one of two major types. The first type of manifold is a ribbon-shape extension of the air permeable layer that is wrapped with air-tight material and routed inside the seat to the air mover or external ducting port. This "porous" manifold exhibits significant hydraulic resistance, limiting the airflow and thus the ventilation efficiency.

The second type of manifold is an arrangement of ducts inside the cushioning element. This type of manifold includes ducts disposed in a direction parallel to the sitting surface. This manifold does not limit the air flow in an unoccupied seat. However, the lateral duct partitions of this type of manifold are prone to collapsing when the weight of a seat occupant applies excessive force against the seat or when the cushioning element becomes softer with age, thereby reducing the performance of the manifold.

SUMMARY OF THE INVENTION

The present invention provides an air manifold for a ventilated seat or bedding that overcomes the deficiencies of the prior art. The present air manifold includes an air permeable structure disposed between the cushioning element and supporting structure of a seat. The air permeable structure delivers air in a lateral direction to specified spots or alternatively sucks air away from these specified spots. The present manifold type has low hydraulic resistance and cost. The present manifold is constructed from low cost standardized components by relatively simple production equipment.

The present air manifold for ventilated seats is disposed between the seat structural support elements and a breathable or perforated seat cushioning element. The manifold is constructed from a polymer-extruded, sufficiently rigid sheet-like air permeable structure including two parallel walls and periodic divider walls or honey-comb structure linking parallel walls together with creation of parallel channels directed along the sheet. The divider walls or honey-comb structure may be partially removed in at least one zone inside the manifold creating common space inside the air manifold so all or a sufficient number of channels are interconnected fluidly. The manifold internal space is sealed from the atmosphere along the manifold contour. An air mover intake/exhaust port or a duct from an external air mover or conditioning unit is in fluid communication with the space inside the air manifold. The air manifold includes a plurality of vents distributed on a wall that faces the cushioning element. The air manifold may also include additional features that make placement of the manifold over non-flat or slightly flexing seat supporting structures possible and that equalize the airflow through the manifold vents.

More particularly, an air manifold for a ventilated seat or bed in accordance with the present invention includes a sheet-like body including first and second spaced, opposing walls and a sealed perimeter. A plurality of divider walls connects the first and second walls together and defines a plurality of air channels within the body. An opening in the body defines an air port cooperable with an air mover. The air port is in fluid communication with the air channels. At least one zone inside the body is free of the divider walls. A group of the air channels are in fluid communication with each other through one of the zones. A plurality of air vents are located in the first wall. Each air vent is in fluid communication with at least one of the air channels. The air manifold is disposable between a seat cushion element and a structural support of a seat. The first wall of the air manifold faces a backside surface of the seat cushion element.

At least a group of the air channels may be generally parallel and adjacent to each other. A greater number of air channels may be in fluid communication with one of the air vents that is distal from the air port than another of the air vents that is proximate the air port.

The zone free of divider walls may generally be a strip disposed along the perimeter of the body. The zone may be disposed along at least a majority of one side of the perimeter of the body. The zone may be in fluid communication with at least a majority of the air channels. The zone may be oriented generally transverse to the air channels. The zone may be contiguous with the air port and/or one or more of the air vents. The zone, the air vents, and/or the air port each may be formed by a cutout through the entire manifold in a thickness direction that is covered by an impermeable patch on at least one of the first and second walls.

At least one generally straight groove may be formed in the body through one of the first and second walls and more than half the thickness of the divider walls, and a patch capable of repeatable jamming may be disposed on one of the first and second walls over the groove. The groove may have a generally V-shaped cross-section.

The body may be formed of at least two distinct sections, and neighboring sections may be spaced no more than a manifold thickness away from each other, and may be connected to each other by a tape hinge mounted on either the first or second wall and a patch capable of repeatable jamming mounted on the other of the first and second walls. The body may be formed of at least two distinct sections, each section may include a plurality of air channels, and air channels of one section may be oriented at an angle relative to air channels of an adjacent section. Air channels in one section may communicate with a fewer or greater number of air channels in an adjacent section. Air channels of more than one section may communicate with one air mover.

The vents may be generally alignable with through passages in the seat cushion element. The vents may be generally arranged in a linear pattern.

The air manifold may also include an air mover in fluid communication with the air port. The air mover may include a housing cooperable with the air port. The air mover housing may be received in the air port.

In another embodiment, an air manifold for a ventilated occupant support includes a sheet-like body including first and second spaced, opposing walls and a sealed perimeter. A plurality of divider walls connect the first and second walls together and define a plurality of air channels within the body. An opening in the sealed perimeter exposes a plurality of the air channels. An air mover assembly is disposed adjacent the opening. The assembly includes an air mover and a multiple passage duct in fluid communication with the opening. A plurality of air vents are located in the first wall. Each air vent may be in fluid communication with at least one of the air channels. The air manifold is disposable between a seat cushion element and a structural support of a seat. The first wall of the air manifold faces a backside surface of the seat cushion element.

The multiple passages of the duct of the air mover assembly may fan out from the air mover. The opening may be formed at a longitudinal end of the manifold. The air mover assembly may be sealed together with the body.

In another embodiment, a ventilated occupant support in accordance with the present invention includes a structural support such as a frame or other solid or deflectable surface. A seat cushion and a seat backrest are supported by the support. The seat cushion has an occupant facing side and an opposite rear side, and the seat backrest has an occupant facing side and an opposite rear side. An air manifold is disposed on at least one of the seat cushion rear side and the seat backrest rear side generally between the seat cushion and the backrest and the support. The air manifold may have any of the features described above. At least one of the seat cushion and the seat backrest includes one or more air passages extending through the seat cushion and/or seat backrest from the rear side to the occupant facing side (or the seat cushion and/or seat backrest may be made of an air permeable material). The one or more air passages are in fluid communication with the air manifold, and the air manifold is in fluid communication with an air mover. An air permeable trim may cover at least the occupant facing side of the seat cushion and seat backrest.

These and other features and advantages of the invention will be more fully understood from the following detailed description of the invention taken together with the accompanying drawings.

DETAILED DESCRIPTION OF THE INVENTION

Figure 1:
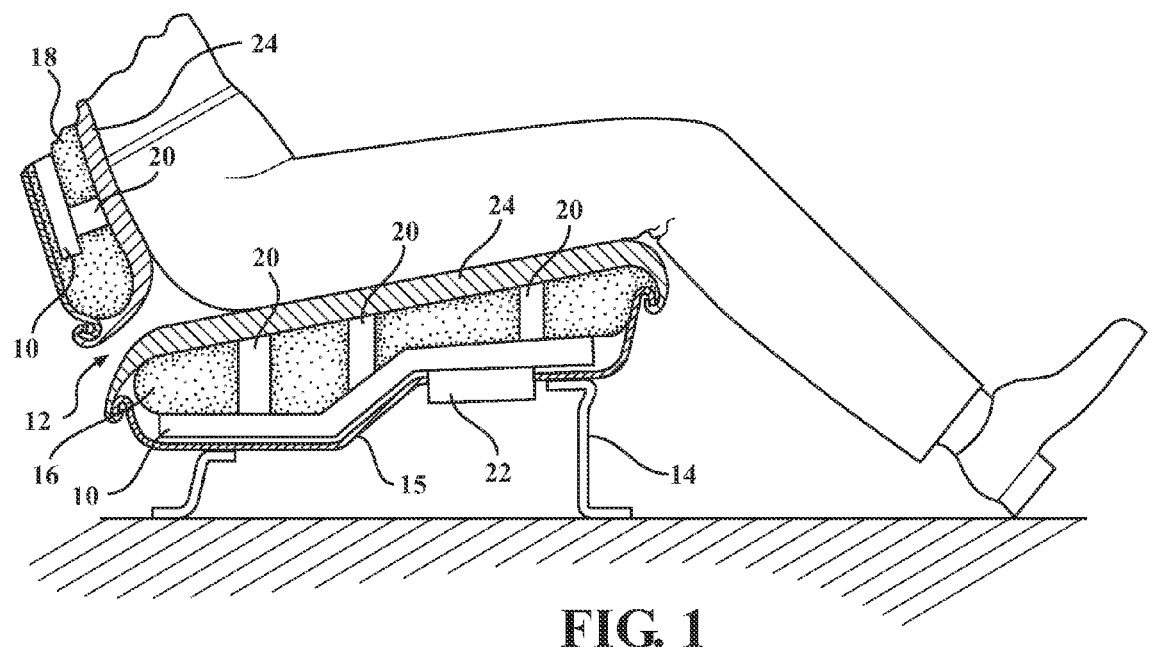
FIG. 1 is a side, sectional view of an occupant support including an air manifold in accordance with the present invention.

Referring now to the drawings in detail, numeral 10 generally indicates an air manifold for a ventilated seat or bed in accordance with the present invention. The air manifold 10 provides for the distribution of air to an occupant facing surface of an occupant support such as a vehicle seat, a chair, a bed, or similar, while having low hydraulic resistance. The air manifold 10 is constructed from low cost standardized components by relatively simple production equipment. In the following description, like reference numbers refer to similar structure in the various embodiments disclosed.

Turning first to FIG. 1, a ventilated occupant support 12 in accordance with the invention includes a frame 14 or other suitable solid support structure or deflectable surface, and a seat cushion 16 and seat backrest cushion 18 supported by the frame. The frame 14 may include a seat pan 15 which supports the seat cushion 16. At least one of the seat cushion 16 and the seat backrest 18 is made air permeable (i.e., is made of an air permeable material) and/or includes one or more air passages 20 extending through the seat cushion and/or seat backrest from a rear side to an occupant facing side. One of the air manifolds 10 is disposed on the seat cushion 16 rear side and/or the seat backrest 18 rear side generally between the seat cushion/seat backrest and the frame 14. The one or more air passages 20 are in fluid communication with the air manifold 10, and the air manifold is in fluid communication with an air mover 22. An air permeable trim 24 may cover the occupant facing side of the seat cushion 16 and seat backrest 18.

Figure 2:
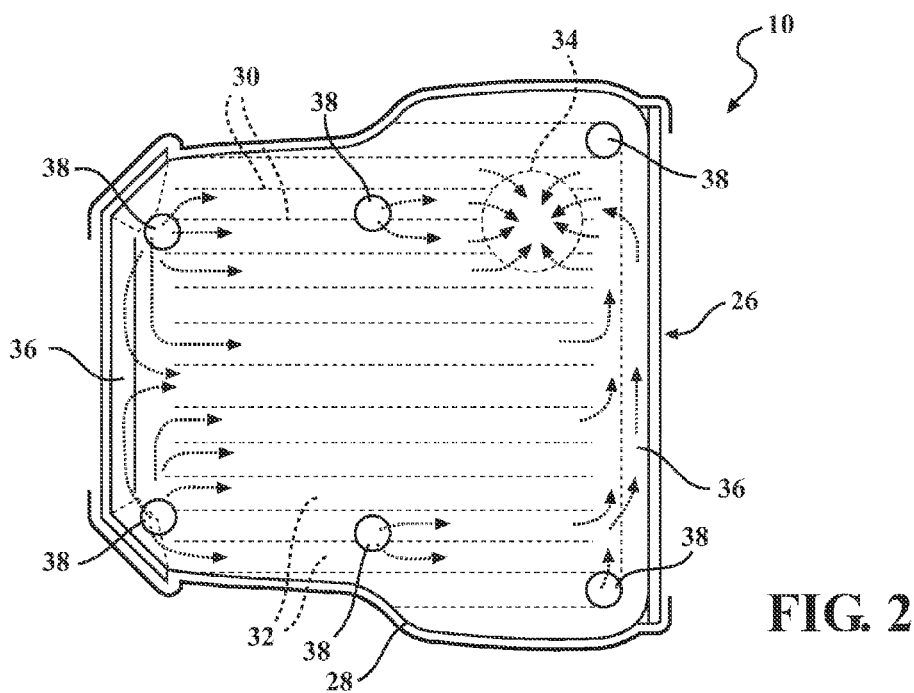
FIG. 2 is a plan view of the air manifold of FIG. 1.
Figure 3:
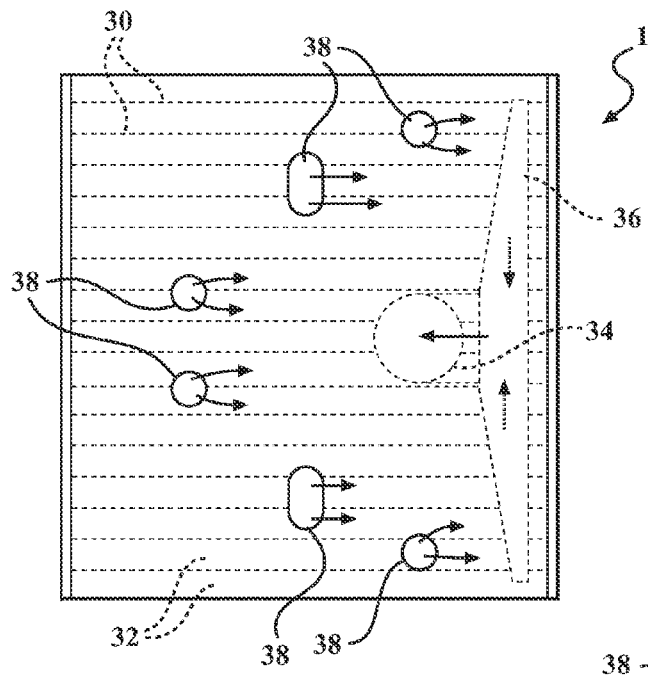
FIG. 3 is a plan view of another air manifold in accordance with the present invention having an alternative air flow pattern.
Figure 4:
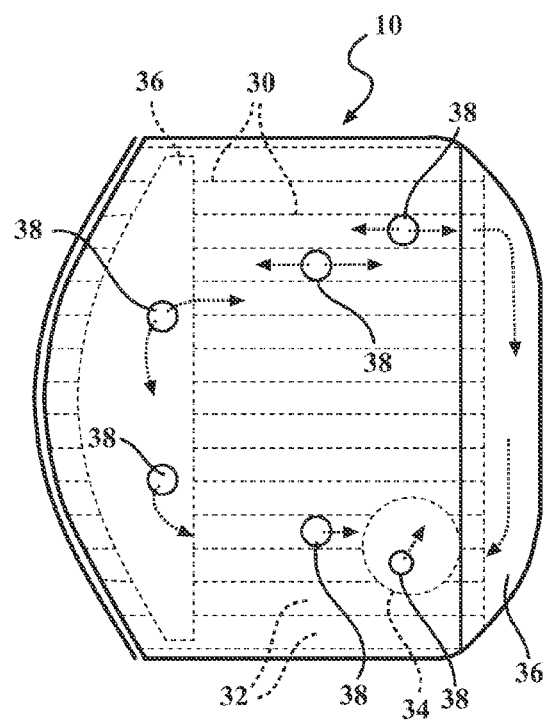
FIG. 4 is a plan view of another air manifold in accordance with the present invention having an alternative air flow pattern.
Figure 5:
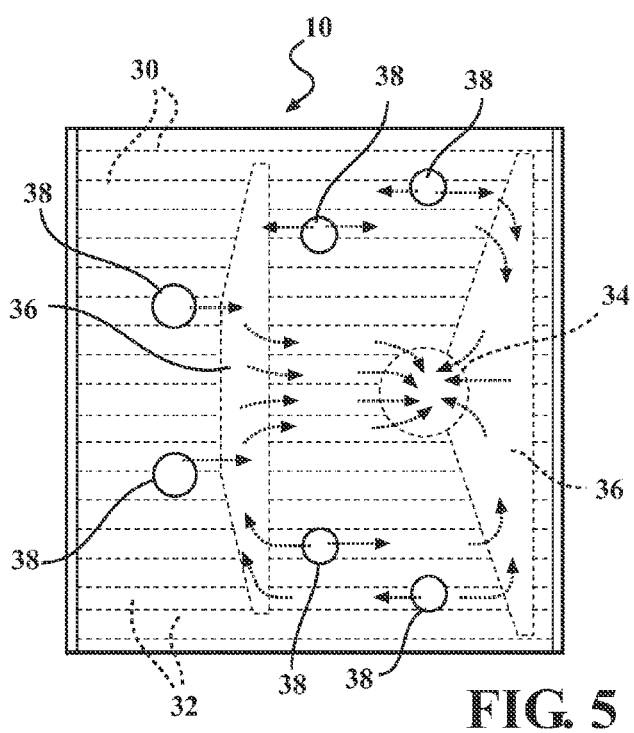
FIG. 5 is a plan view of another air manifold in accordance with the present invention having an alternative air flow pattern.

As shown in FIG. 2, the air manifold 10 includes a sheet-like body 26 having first and second spaced, opposing walls. Only the first, upper wall 28 is visible in the figure. A plurality of divider walls 30 connecting the first and second walls together define a plurality of air channels 32 within the body 26. An opening in the body defines an air port 34 cooperable with an air mover. The air port 34 is in fluid communication with the air channels 32. At least one zone 36 inside the body is free of the divider walls 30. A group of the air channels 32 are in fluid communication with each other through one of the zones 36. A plurality of air vents 38 are located in the first wall 28. Each air vent 38 is in fluid communication with at least one of the air channels 32. Air flow through the air manifold 10 is shown schematically by arrows. FIGS. 3-5 illustrate alternative arrangements/dispositions of the air port 34, divider/channel "free" zones 36, and air vents 38, and the resulting air flow through the air manifold 10.

Figure 6:
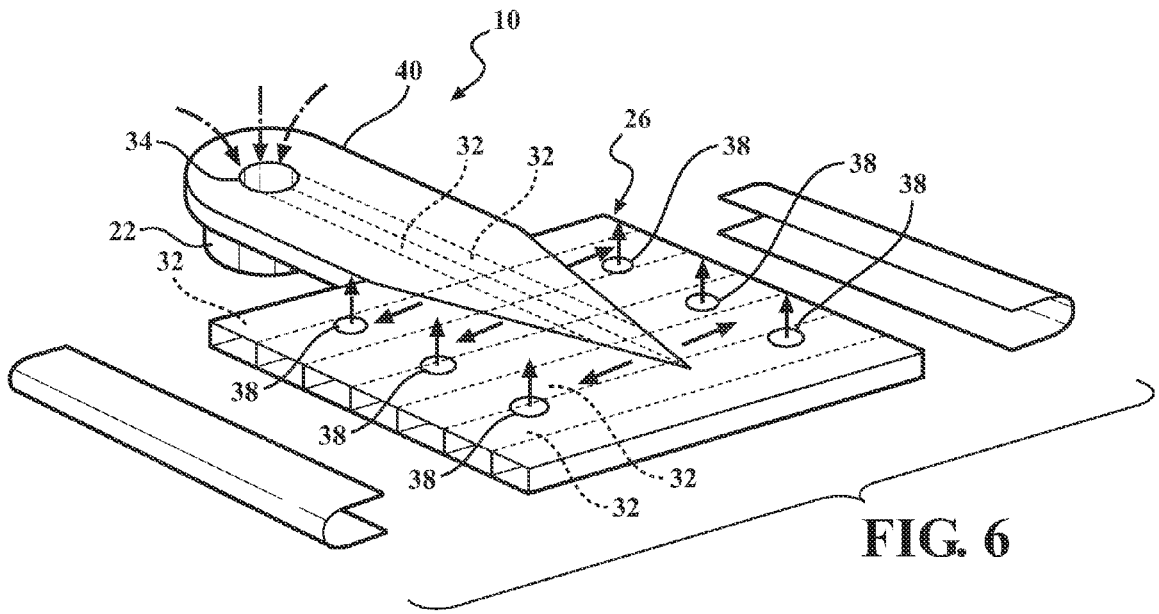
FIG. 6 is an exploded view of another air manifold in accordance with the present invention having an alternative air flow pattern.
Figure 7:
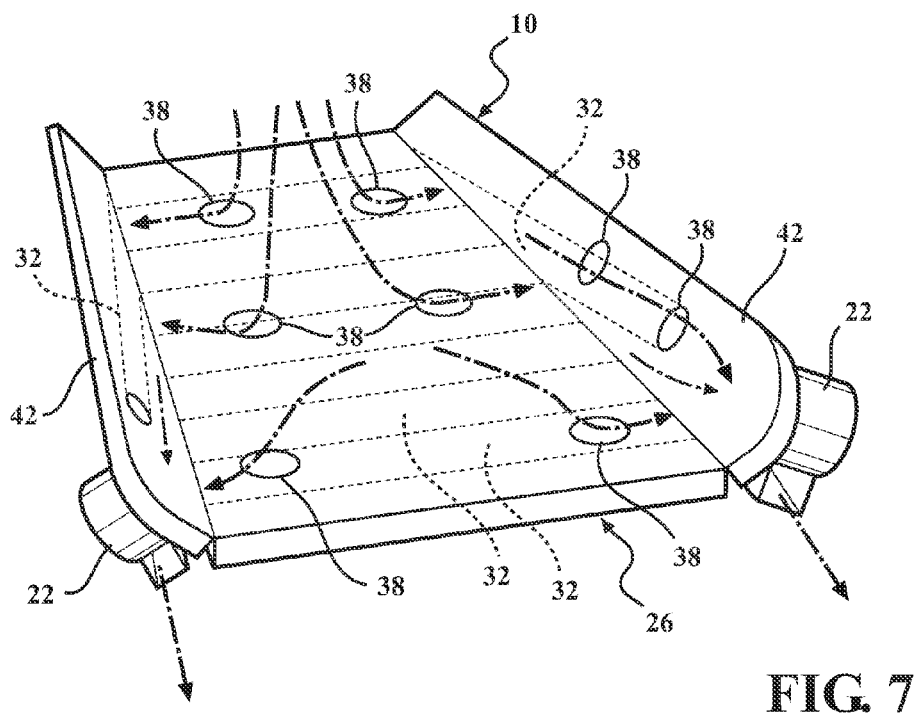
FIG. 7 is a perspective view of another air manifold in accordance with the present invention having an alternative air flow pattern.

In an alternative arrangement shown in FIG. 6, the air port 34 and air mover 22 may be disposed in an extended section 40 whose air channels 32 are generally perpendicular to the air channels 32 in the main portion of the air manifold body 26. In yet another arrangement shown in FIG. 7, the air movers 22 and their corresponding air ports are disposed in lateral sections 42 whose air channels 32 are disposed at an angle to the air channels 32 in the main portion of the air manifold body 26.

Figure 8:
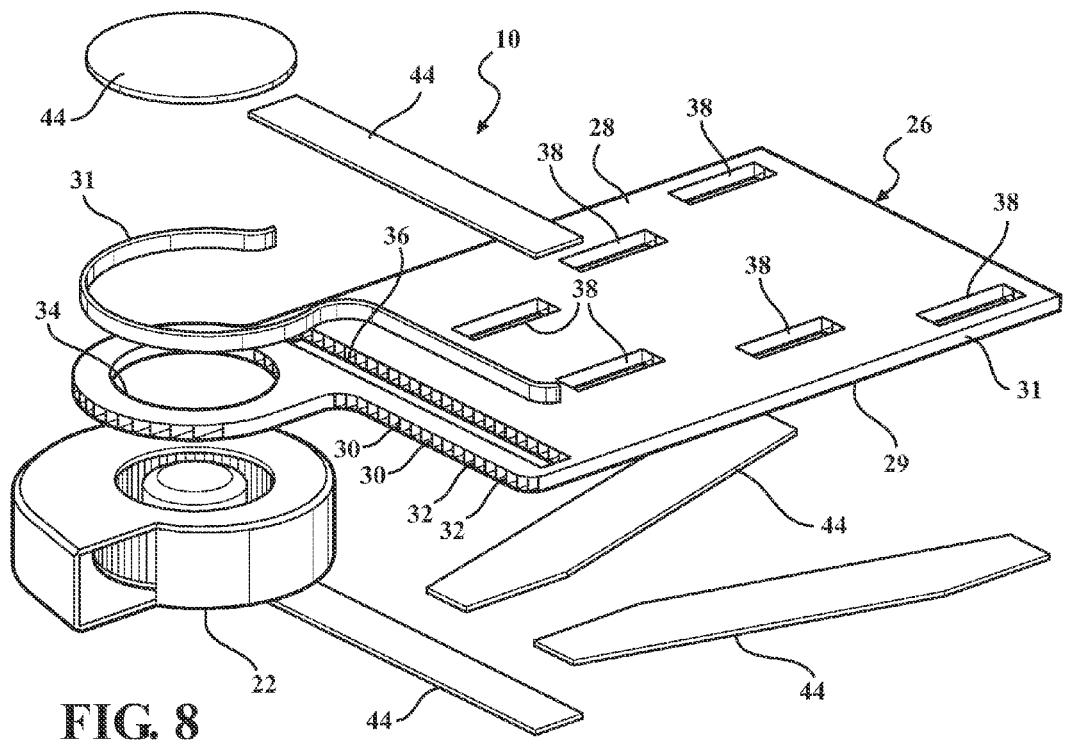
FIG. 8 is an exploded view of another air manifold in accordance with the present invention.
Figure 9:
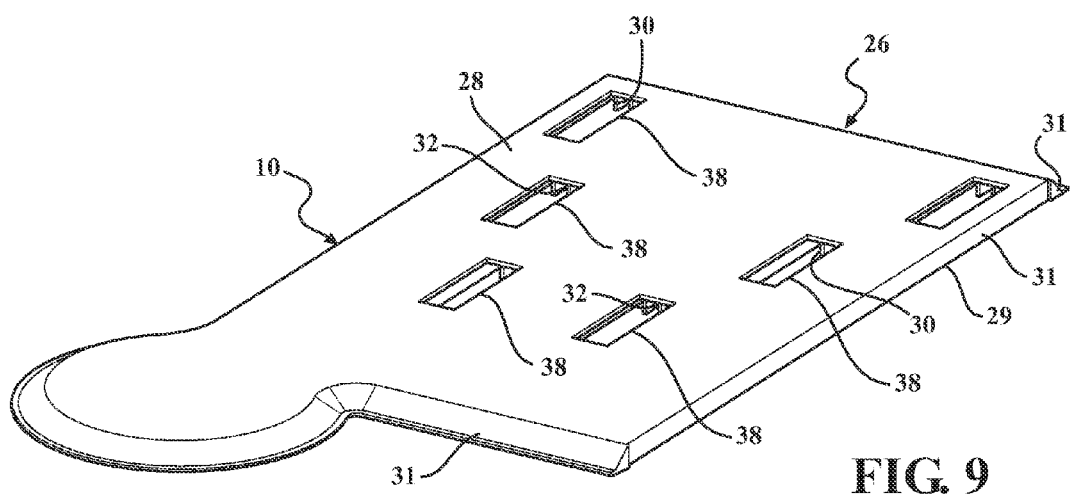
FIG. 9 is a perspective view of the air manifold of FIG. 8.

FIGS. 8 and 9 illustrate another embodiment of an air manifold 10 for a ventilated seat or bed in accordance with the present invention. The air manifold 10 includes a sheet-like body 26 including a first, upper wall 28 and a second, lower wall 29 spaced and opposing the first wall 28, and a sealed perimeter 31. Divider walls 30 connect the first and second walls 28, 29 together and define a plurality of air channels 32 within the body 26. The air channels 32 are generally parallel and adjacent to each other. An opening in the body defines an air port 34 cooperable with and in fluid communication with an air mover 22. The air port 34 is in fluid communication with the air channels 32. A zone 36 inside the body 26 is free of the divider walls 30. A group of the air channels 32 are in fluid communication with each other through the zone 36. Air vents 38 are located in the first wall 28. Each air vent 38 is in fluid communication with at least one of the air channels 32. Groups of the vents 38 are arranged in a linear pattern. The zone 36, the air vents 38, and the air port 34 are each formed by a cutout through the entire manifold 10 in a thickness direction thereof, and each cutout is covered by an impermeable patch 44 on at least one of the first and second walls 28, 29.

Figure 10:
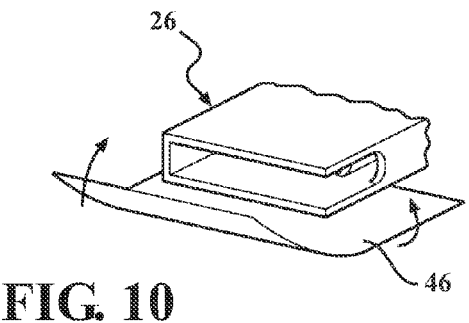
FIG. 10 is a partial view of an air manifold in accordance with the present invention illustrating a method of sealing a perimeter of the manifold.
Figure 11:
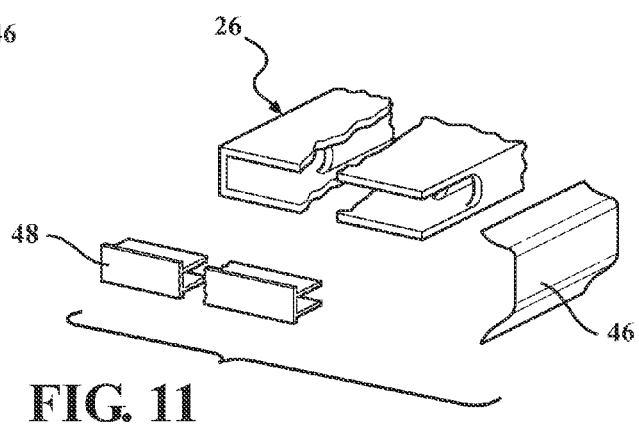
FIG. 11 is a partial view of an air manifold in accordance with the present invention illustrating another method of sealing a perimeter of the manifold.

Two methods of sealing the perimeter of the air manifold body 26 are shown in FIGS. 10 and 11. In FIG. 10, an open end/edge of the manifold body 26 is sealed with an adhesive tape 46 or similar. In FIG. 11, an open end/edge of the manifold body 26 is sealed with both adhesive tape 46 and a cap 48 that fits into and covers the open end.

Figure 12:
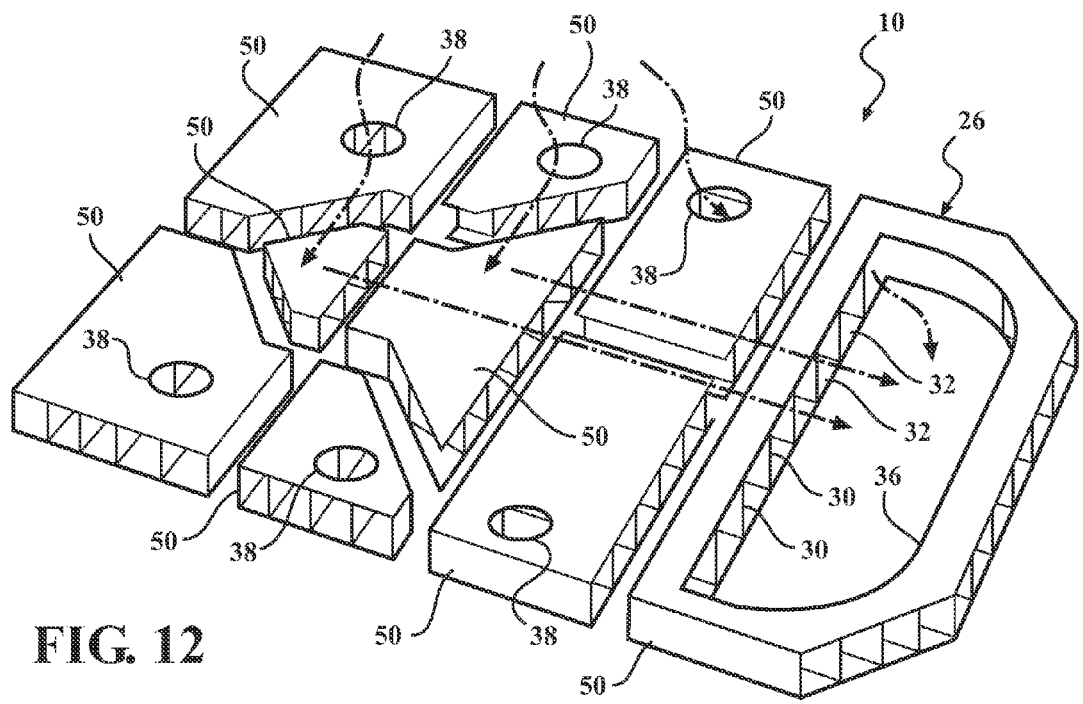
FIG. 12 is a perspective view of another air manifold in accordance with the present invention having a plurality of sections.

Turning to FIG. 12, in another embodiment, the body 26 of the air manifold 10 is formed of a plurality of distinct sections 50. Each section 50 includes divider walls 30 which define generally parallel air channels 32. The air channels 32 of the various sections 50 may be disposed at angles relative to each other (e.g., from greater than 0° to less than 180°) to influence the direction of air flow through the air manifold 10 as shown by arrows. Some of the sections 50 include an air vent 38. Neighboring sections 50 should be spaced at a distance from each other that is generally no more than the thickness of the manifold body 26. The presence of the sections 50 influences air flow as described above and also provides the air manifold 10 with greater flexibility for easier and/or more precise mounting of the air manifold relative to a seat cushion.

Figure 13:
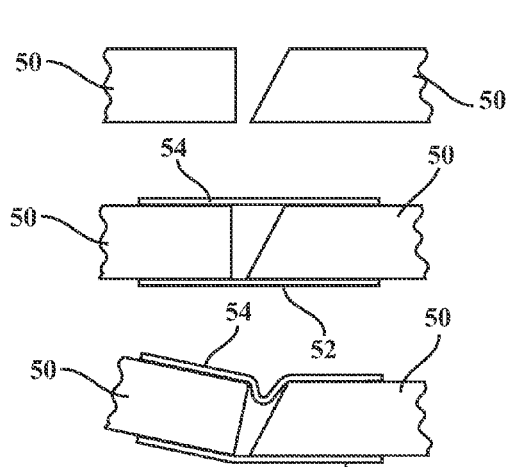
FIG. 13 is a side view illustrating formation of a hinge in an air manifold in accordance with the present invention.
Figure 14:
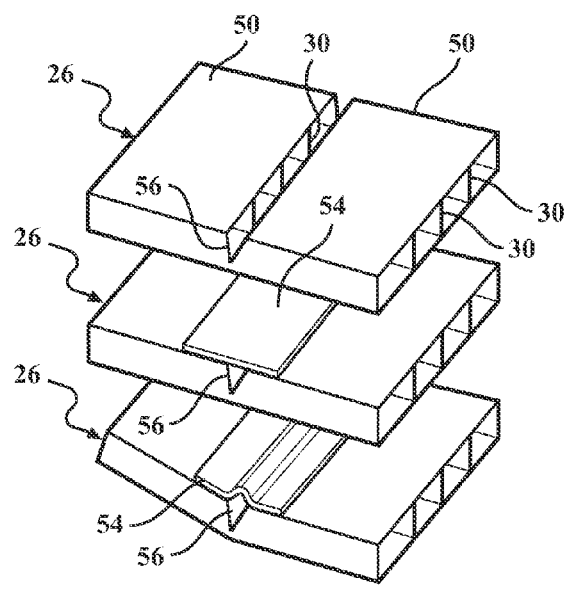
FIG. 14 is a perspective view illustrating formation of a hinge in an air manifold in accordance with the present invention.

As shown in FIG. 13, neighboring, adjacent distinctive sections 50 of the air manifold may be connected to each other by a tape hinge 52 mounted on the first or second wall and a patch 54 capable of repeatable jamming mounted on the other of the first and second wall. The outer edge of one of the sections 50 may be angled relative to the adjacent section 50 to allow a greater range of movement about the hinged sections. Alternatively, as shown in FIG. 14, the sections 50 may not be physically separated. Instead, two adjacent sections 50 may be "divided" by a generally straight groove 56 that is formed in the body 26 through one of the first and second walls. The groove 56 should penetrate more than half the thickness of the divider walls 30 (i.e., more than half the thickness of the body 26) and may have a generally V-shaped or U-shaped cross-section to allow for a sufficient range of movement between the sections 50. A patch 54 capable of repeatable jamming is disposed on the wall over the groove 56.

Figure 15:
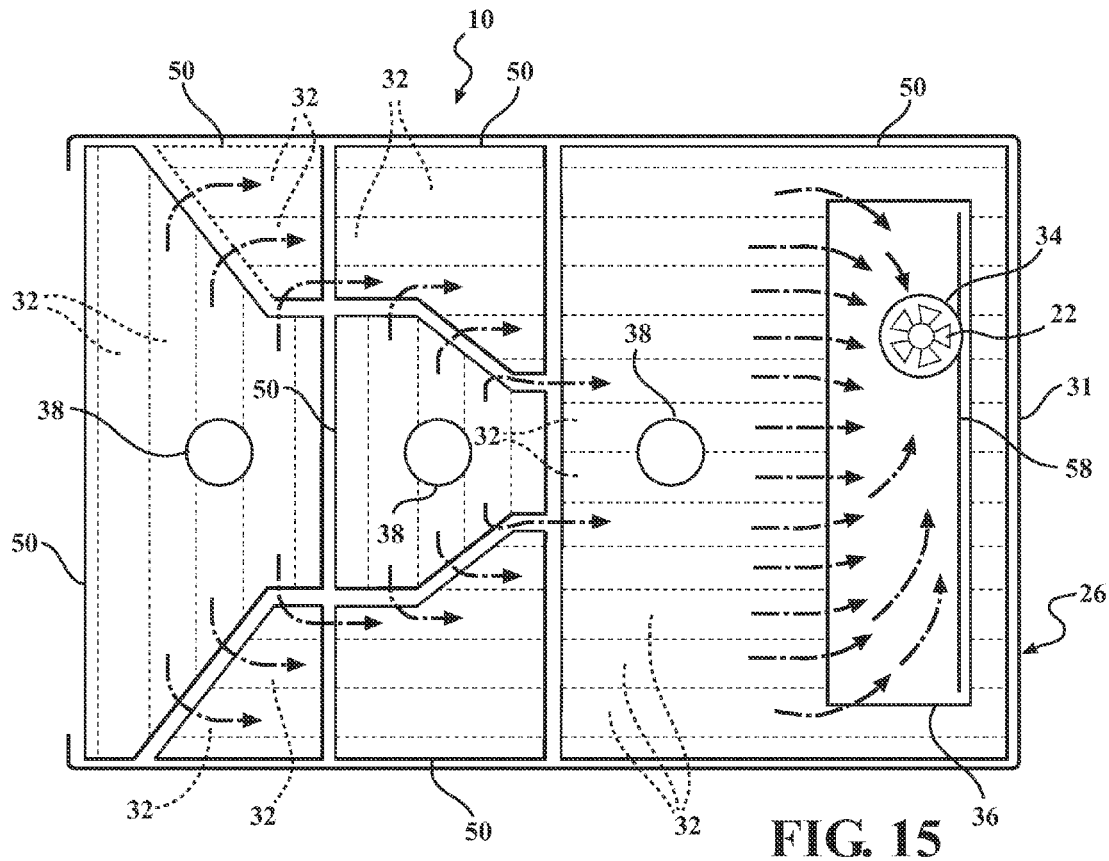
FIG. 15 is a plan view of another air manifold in accordance with the present invention having a plurality of sections.

Turning to FIG. 15, in another embodiment of the air manifold 10, the channel "free" zone 36 is generally a strip disposed along a majority of a side of the sealed perimeter 31 of the body 26. The zone 36 is disposed generally perpendicular (i.e., transverse) to the air channels 32 across which it is formed. Hence, the zone is in fluid communication with a majority of the air channels 32 in the section 50 of the manifold 10 in which it is formed. The zone 36 is also contiguous with (i.e., formed in the same region as) the air port 34 and its corresponding air mover 22. A "wall" of the zone 36 may be sealed with a strip of material 58 or similar to prevent air flow into non-acting, dead end air channels, reducing hydraulic resistance in the zone 36. The vents 38 are arranged in a linear pattern, and a greater number of air channels 32 are in fluid communication with one vent 38 that is distal from the air port 34 and zone 36 in comparison to the number of air channels 32 in fluid communication with a vent that is proximate the air port 34 and zone 36. The air channels 32 of two of the sections 50 of the air manifold 10 are disposed generally at an angle (in the embodiment shown they are generally perpendicular) to the air channels 32 of the other sections 50 to redirect air flow from the vents 38 to the open zone 36 and air port 34 as shown schematically by the arrows in the figure.

Figure 16:
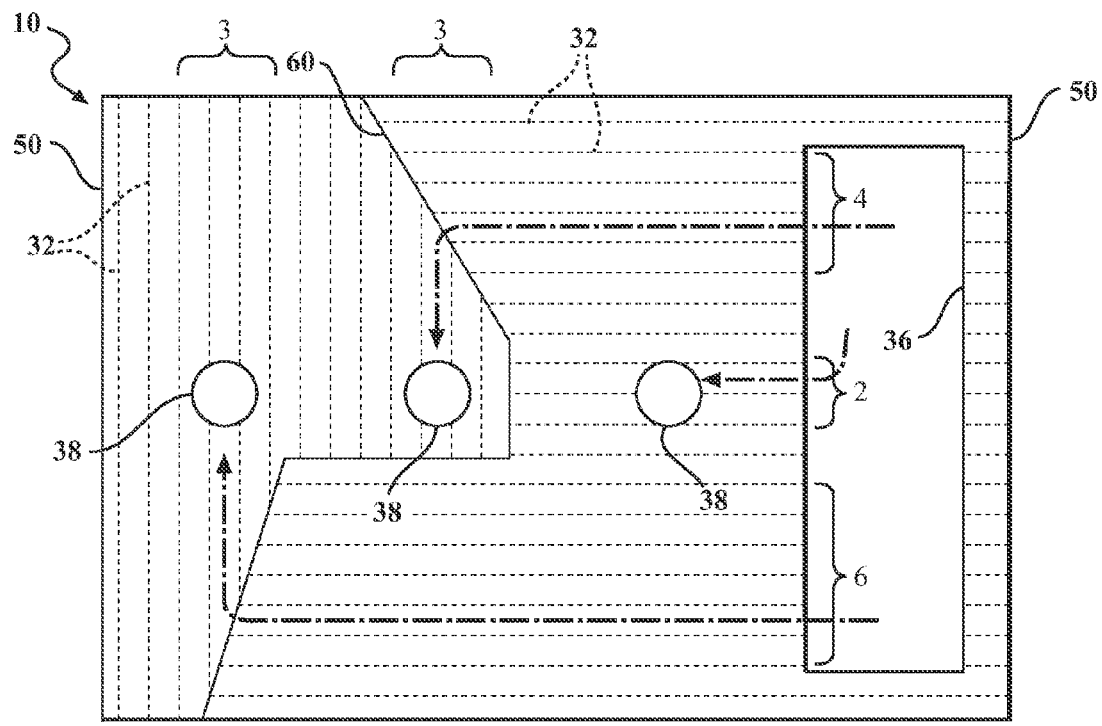
FIG. 16 is a plan view of another air manifold in accordance with the present invention having a plurality of sections.

Another arrangement of air channels 32, vents 38, and the open zone 36 is shown in FIG. 16. In this embodiment, the air manifold 10 includes two sections 50 divided or separated from each other along a line 60. The air channels 32 in one of the sections 50 are disposed generally perpendicular to the air channels 32 in the other section 50. The vent 38 closest to the open zone 36 is in fluid communication with two air channels 32. The next farthest vent 38 from the open zone 36 is in fluid communication with a greater number of air channels 32, specifically four channels in the section 50 including the open zone 36 and three channels in the section 50 in which this vent 38 is disposed. The furthest vent 38 from the open zone 36 is in fluid communication with the greatest number of air channels 32, specifically six channels in the section 50 including the open zone 36 and three channels in the section 50 in which this vent 38 is disposed. Therefore, the vents 38 that are farther from the open zone 36, and hence farther from the air mover, are provided with a greater volume of air space to communicate with the open zone 36 on the most part of this air passage, thereby balancing the flow of air through the air manifold 10. Also, air channels 32 in one of the sections 50 communicate with a fewer or greater number of air channels 32 in an adjacent section 50.

Figure 17:
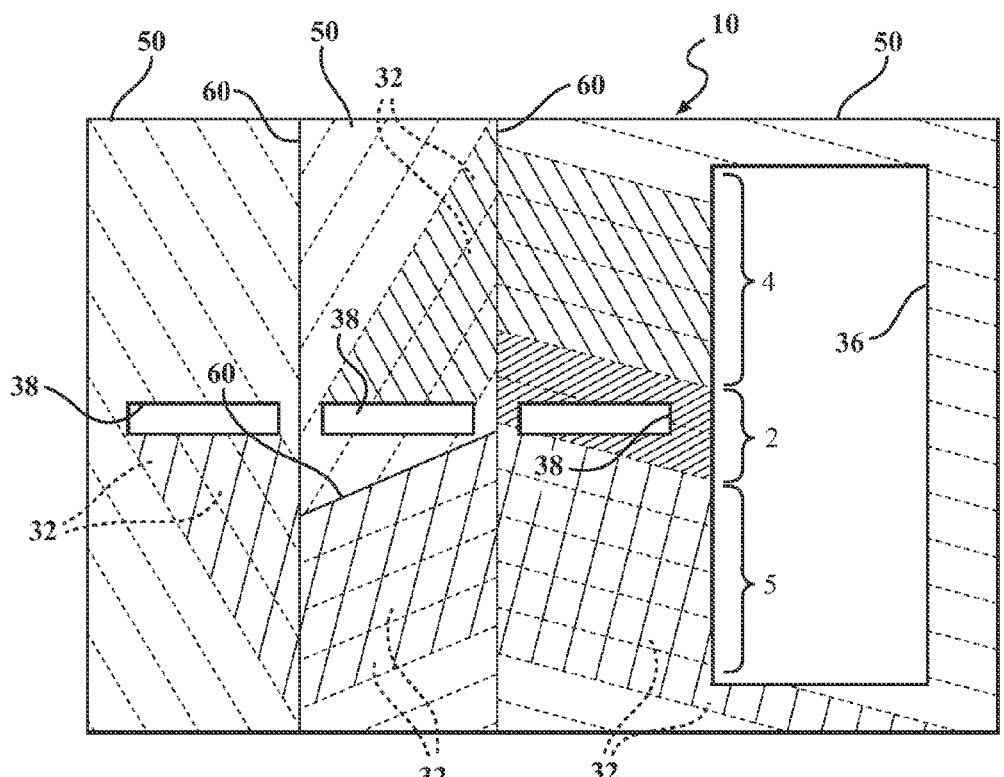
FIG. 17 is a plan view of another air manifold in accordance with the present invention having a plurality of sections.

Yet another arrangement of air channels 32, vents 38, and the open zone 36 is shown in FIG. 17. In this embodiment, the air manifold 10 includes four sections 50 divided or separated from each other along lines 60. The air channels 32 in adjacent sections 50 are disposed at angles relative to each other to redirect air flow. The vents 38 are generally rectangular in shape are disposed in a linear pattern. However, the air channels 32 are disposed at angles relative to the vents 38. The vent 38 closest to the open zone 36 is in fluid communication with two air channels 32 in the section 50 including open zone 36. The next farthest vent 38 from the open zone 36 is in fluid communication with a greater number of air channels 32, specifically four channels in the section 50 including the open zone 36. The furthest vent 38 from the open zone 36 is in fluid communication with the greatest number of air channels 32, specifically five channels in the section 50 including the open zone 36.

Figure 18:
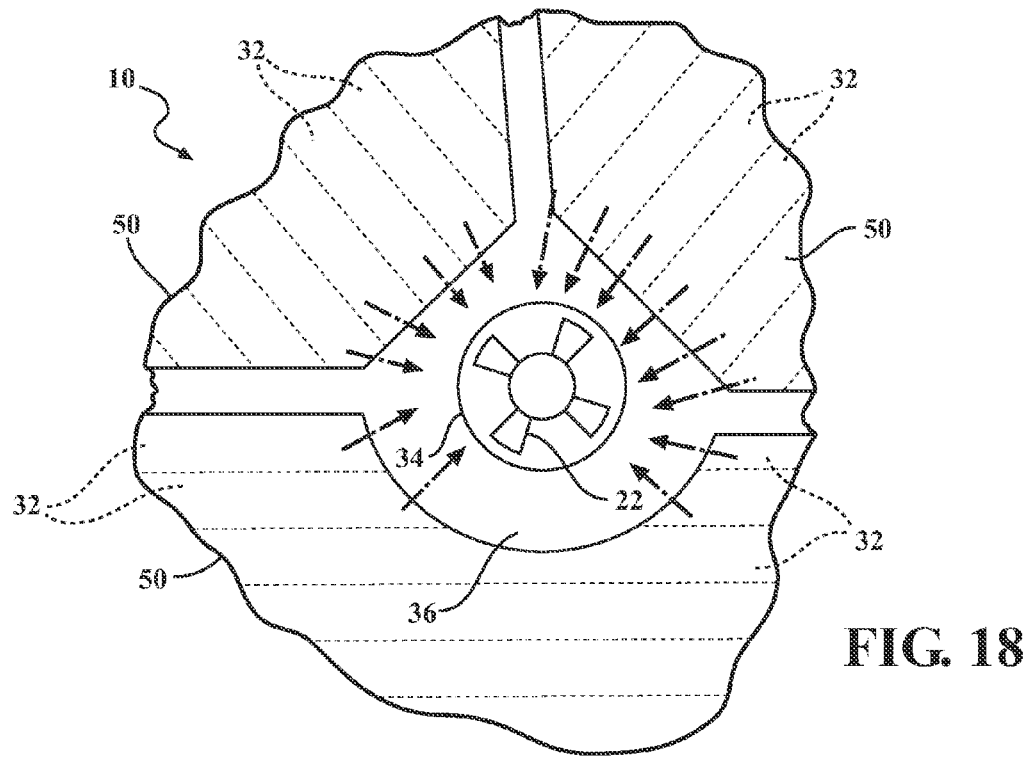
FIG. 18 is a schematic view of another air manifold in accordance with the present invention.

Turning to FIG. 18, another embodiment of the air manifold 10 is shown schematically. In this embodiment, the air mover 22 and air port 34 and the corresponding open zone 36 are generally centrally located in the air manifold and the air channels 32 of the various separate sections 50 are generally disposed around the circumference of the air port 34 and open zone 36. Thus, the air channels 32 of the various separate sections 50 communicate with the same air mover 22.

Figure 19:
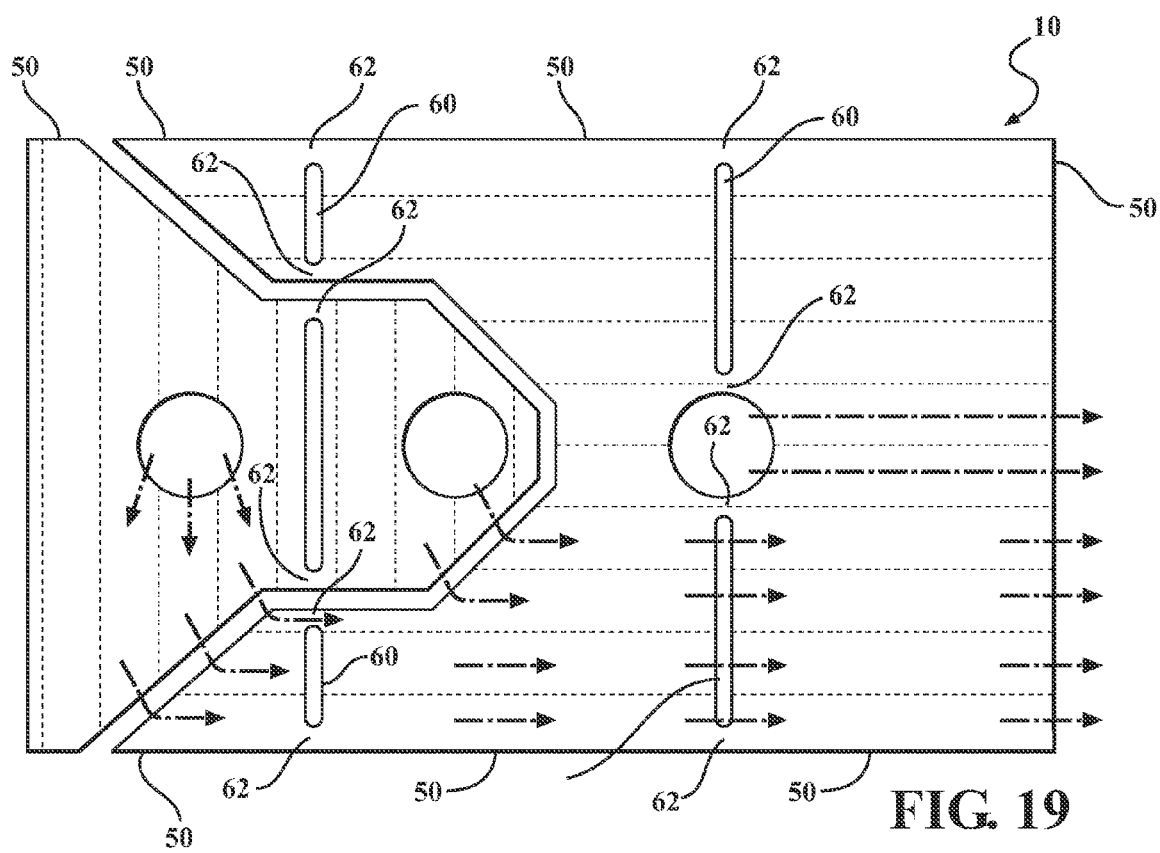
FIG. 19 is a plan view of another air manifold in accordance with the present invention having a plurality of sections.

As shown in FIG. 19, some of the adjacent manifold sections 50 may be interlinked by links/lands 62 that are created during forming the adjacent pieces by making cut lines 60 in a single piece of material. The links/lands 62 may be created as a result of voids left by laser cutting, water jet cutting, die cutting, or similar. The links/lands 62 allow the air manifold sections to be easily positioned while fixing them within an envelope (see below), thereby maintaining alignment of the air channels of adjacent manifold sections 50 while positioning the manifold 10. After fixing of the air manifold sections in the envelope, the links/lands 62 may be severed to allow for greater bending of the air manifold structure.

Figure 20:
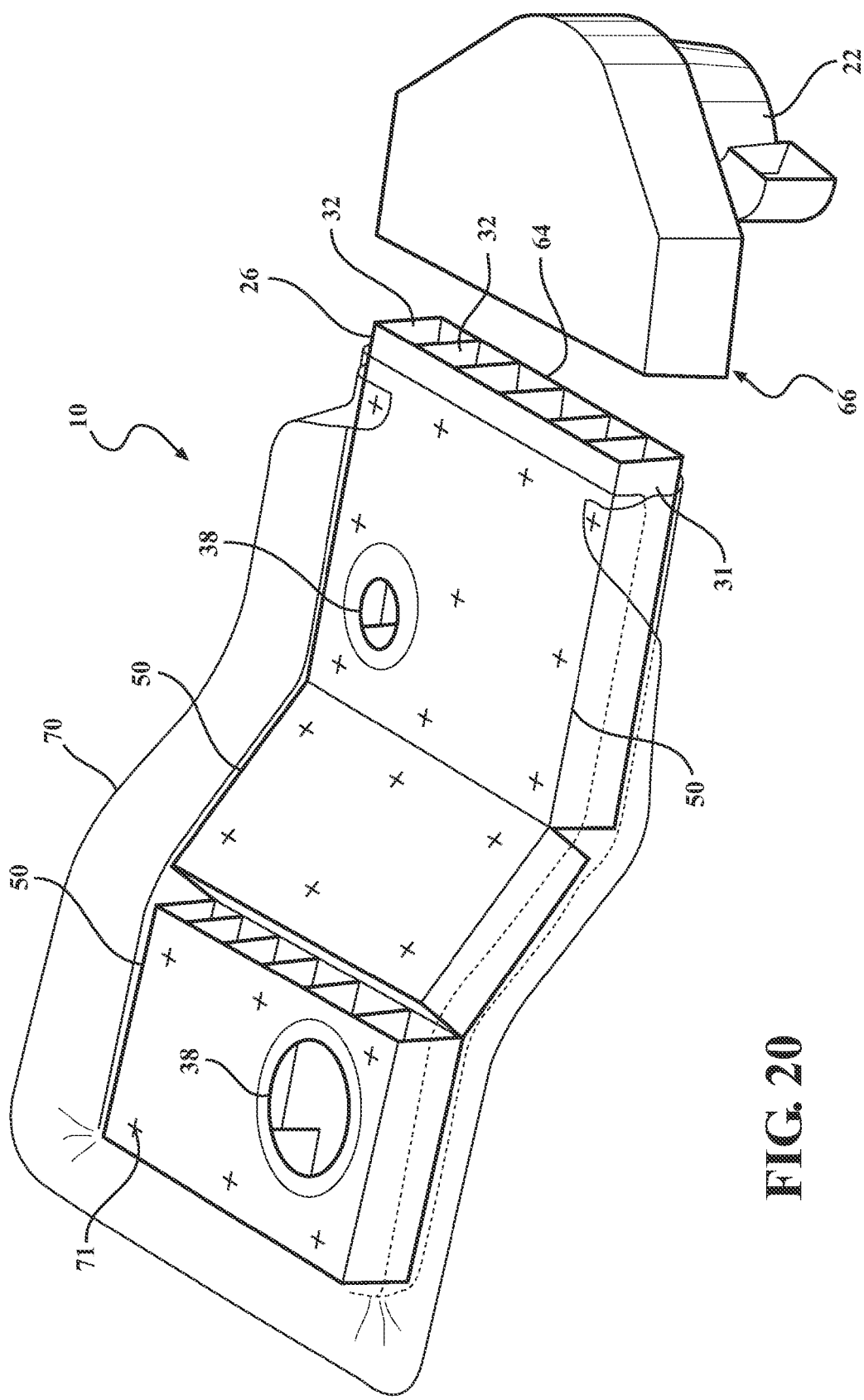
FIG. 20 is an exploded view of an air manifold in accordance with the present invention including an air mover assembly.
Figure 21:
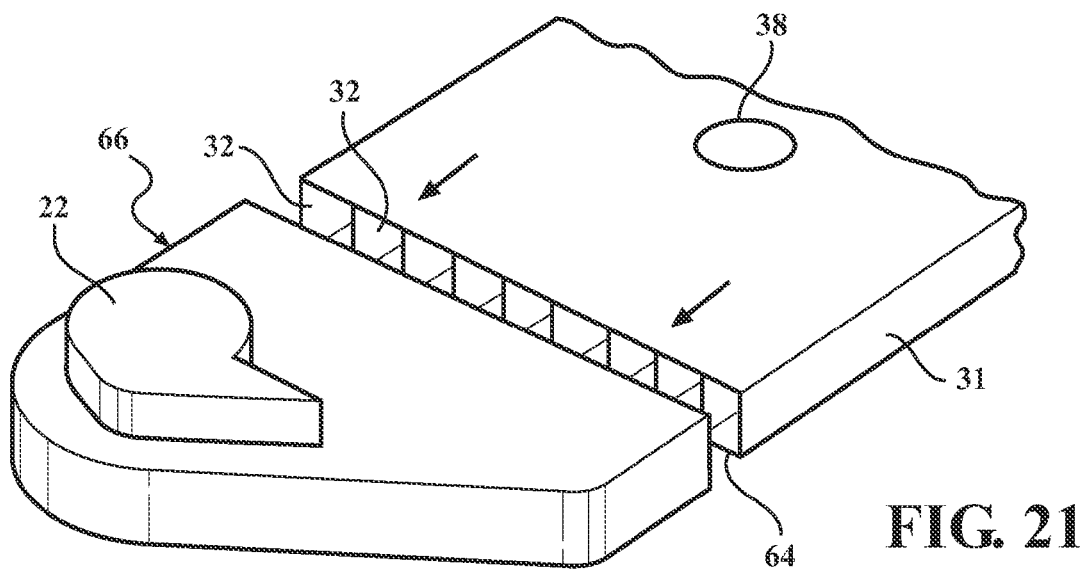
FIG. 21 is a partial perspective view of the air manifold of FIG. 20.
Figure 22:
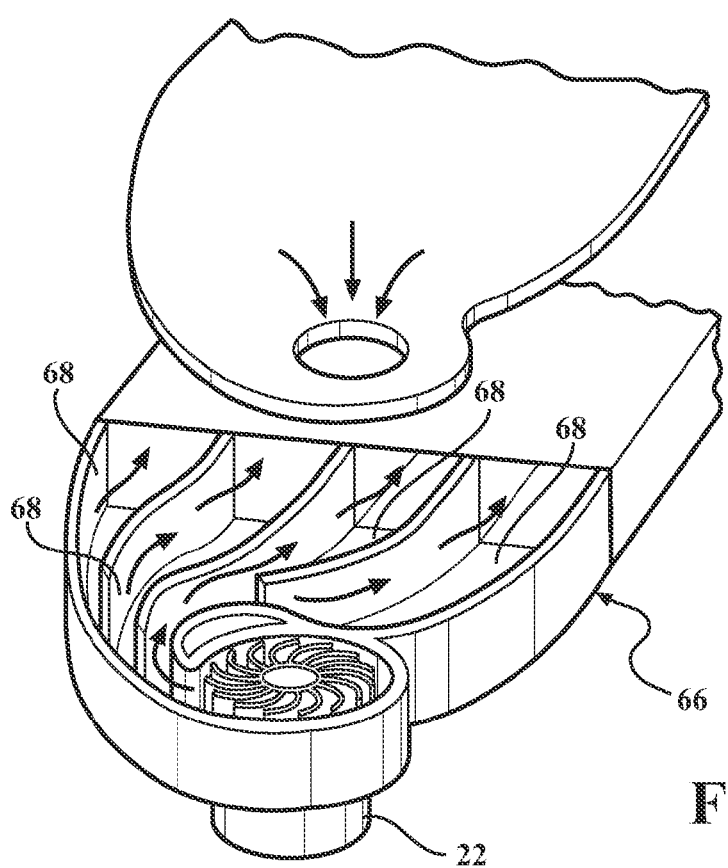
FIG. 22 is an exploded view of the air mover assembly of the air manifold of FIG. 20.

Turning to FIGS. 20-22, in another embodiment, the air manifold 10 includes an opening 64 in the sealed perimeter 31 that exposes a plurality of the air channels 32. The opening 64 may be formed at a longitudinal end of the air manifold 10 as shown in FIG. 20. An air mover assembly 66 is disposed adjacent the opening 64. The assembly 66 includes the air mover 22 and a duct including a plurality of passages 68 in fluid communication with the opening 64 and hence the air channels 32. The passages 68 may fan out from the air mover 22 as shown in FIG. 22. Alternatively, the duct may include a single passage. A plurality of vents 38 are in fluid communication with the air channels 32. The air move assembly 66 is sealed together with the body 26 of the manifold 10, and the body 26 may be disposed in a bag 70, envelope, or similar that has at least an air permeable side 71 adjacent the vents 38 to allow for air flow between the inside and the outside of the bag/envelope 70. The body 26 may be mounted on an inner surface of the bag/envelope 70 to fix the sections 50 of the body 26 in desired positions. One side of the bag/envelope 70 may be stiffer than the other side to control the flexibility of the bag/envelope.

Figure 23:
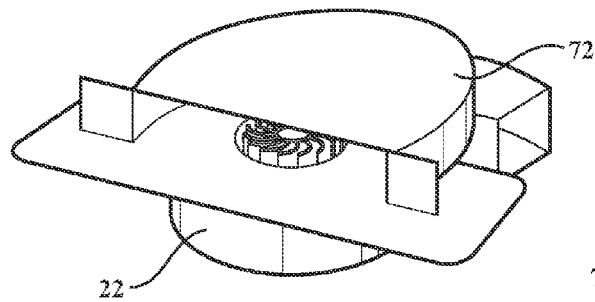
FIG. 23 is a perspective view of an air mover for an air manifold in accordance with the present invention.
Figure 25:
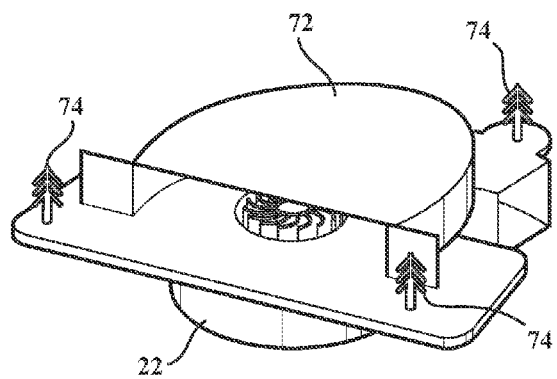
FIG. 25 is a perspective view of an alternative embodiment of the air mover of FIG. 23.
Figure 24:
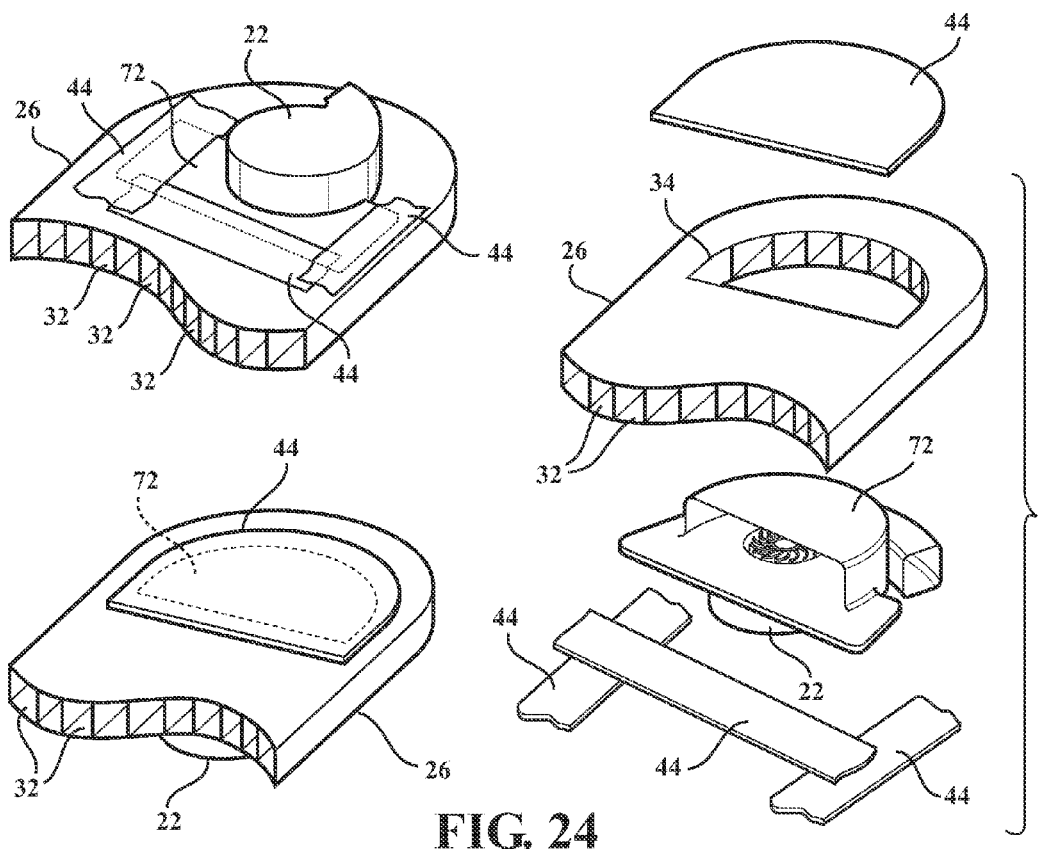
FIG. 24 is an exploded, perspective view illustrating mounting of the air mover of FIG. 23 in an air manifold in accordance with the present invention.
Figure 26:
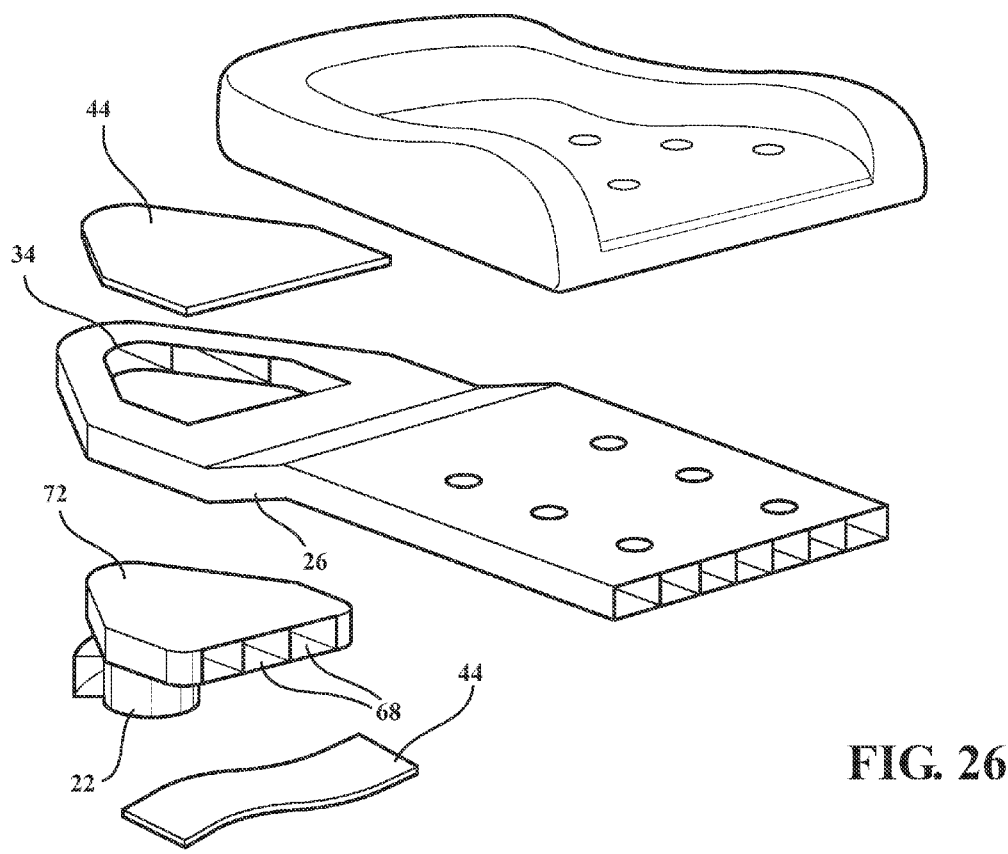
FIG. 26 is an exploded view of an air manifold in accordance with the present invention disposed below a seat cushion.

As shown in FIGS. 23-25, the air mover 22 may include a housing 72 cooperable with the air port 34. The housing 72 is received in the air port 34 to fluidly connect the air mover 22 to the air channels 32 in the manifold body 26. The connection between the housing 72 and the air port 34 may be sealed with impermeable patches 44. Optionally, the housing 72 may include mounting members 74 such as feathered posts, rivets, or the like that secure the housing to the manifold body 26. A similar arrangement is shown in FIG. 26. However, in this embodiment the housing 72 includes a plurality of ducts 68 that fan out from the air mover 22.

Figure 27:
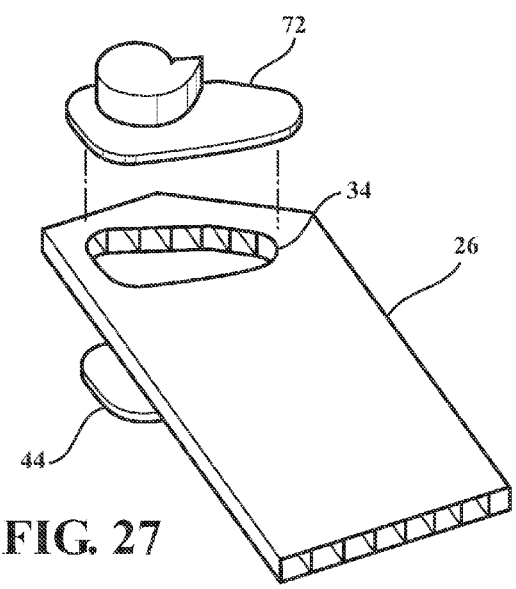
FIG. 27 is an exploded view illustrating a method of mounting an air mover in an air manifold in accordance with the present invention.

Alternatively, as shown in FIG. 27, the air mover housing 72 may be mounted on the outside of the manifold body 26 adjacent the air port 34. The opposite side of the air port 34 is then sealed with an impermeable patch 44.

Figure 28:
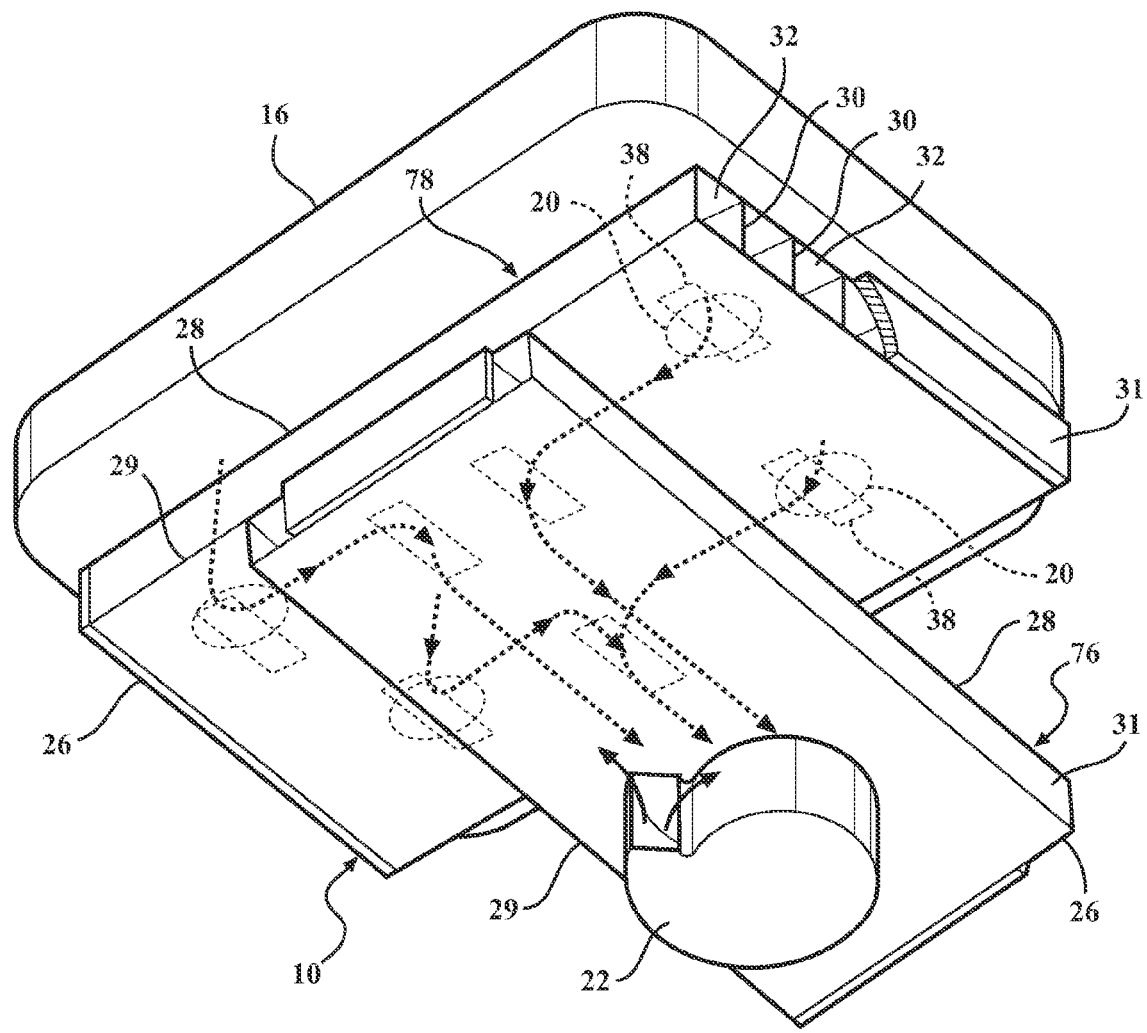
FIG. 28 is a perspective view of an air manifold in accordance with the present invention disposed adjacent a bottom surface of a seat cushion.
Figure 29:
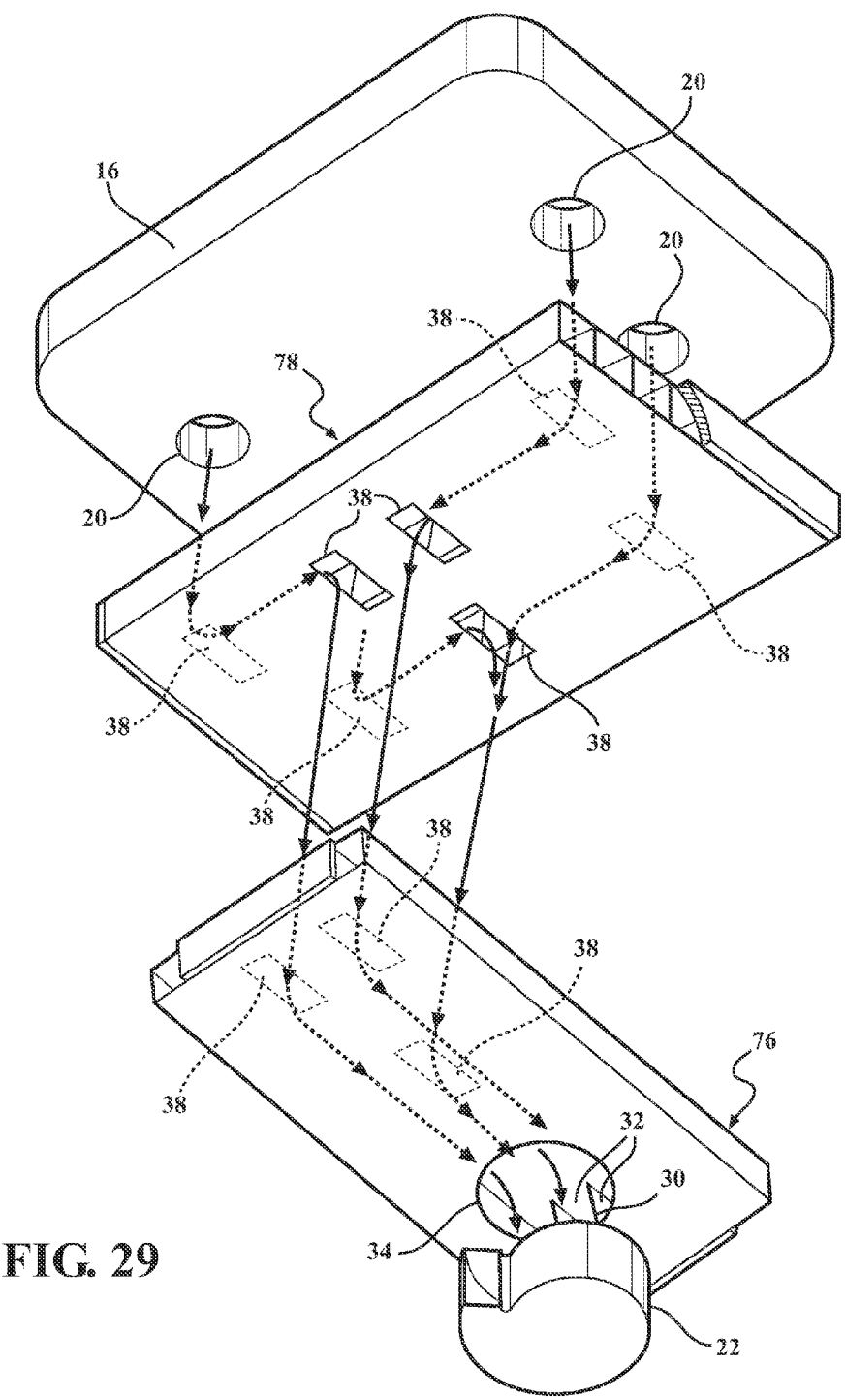
FIG. 29 is an exploded view of the air manifold and seat cushion of FIG. 28.
Figure 30:
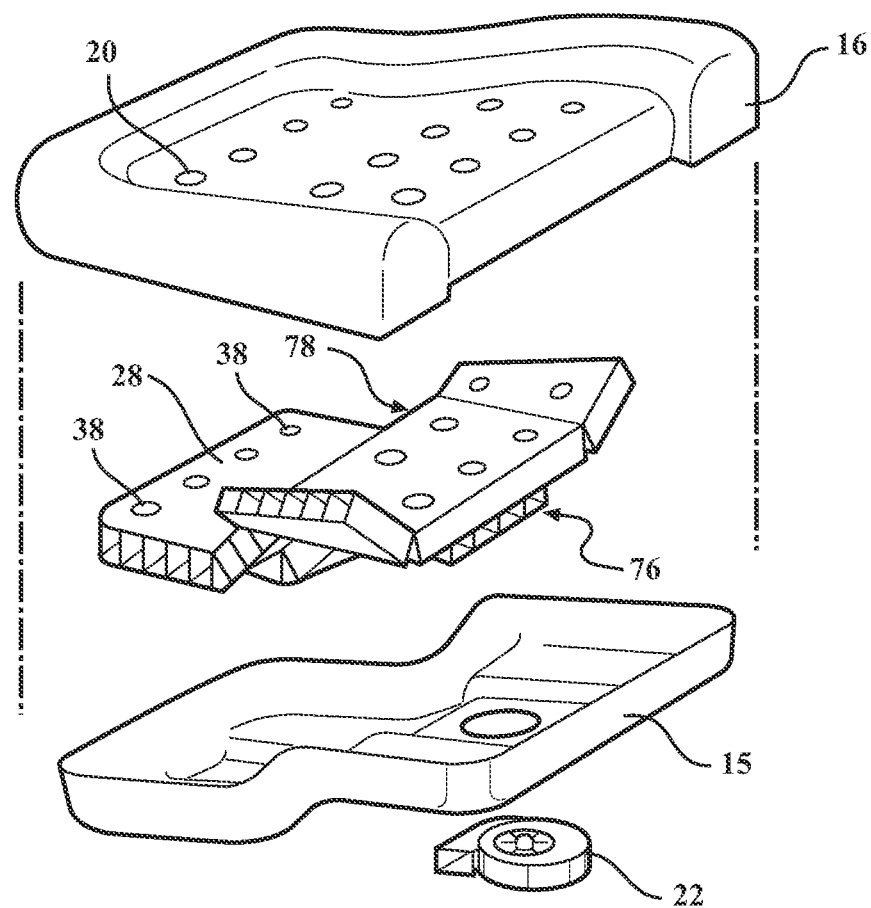
FIG. 30 is an exploded view of a ventilated occupant support including the air manifold and seat cushion of FIG. 28.
Figure 31:
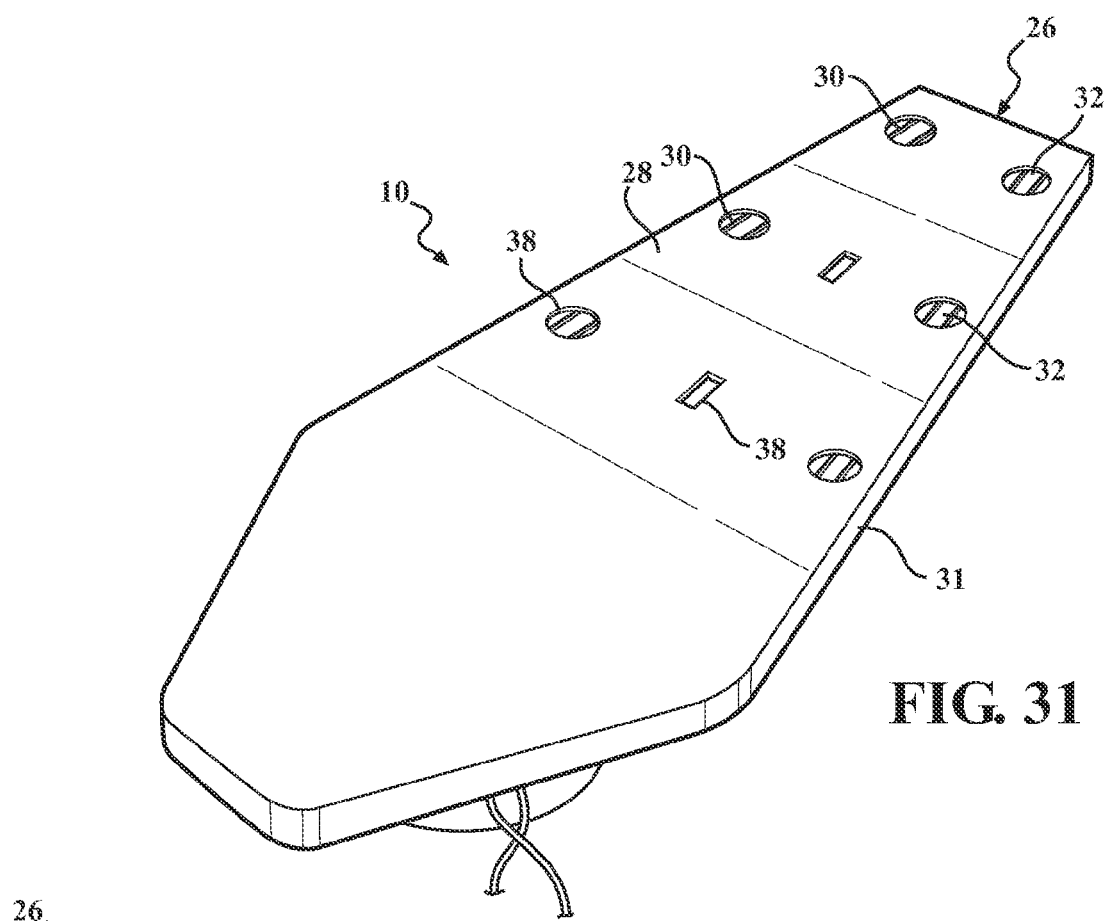
FIG. 31 is a perspective view of an occupant facing side of an air manifold in accordance with the present invention.
Figure 32:
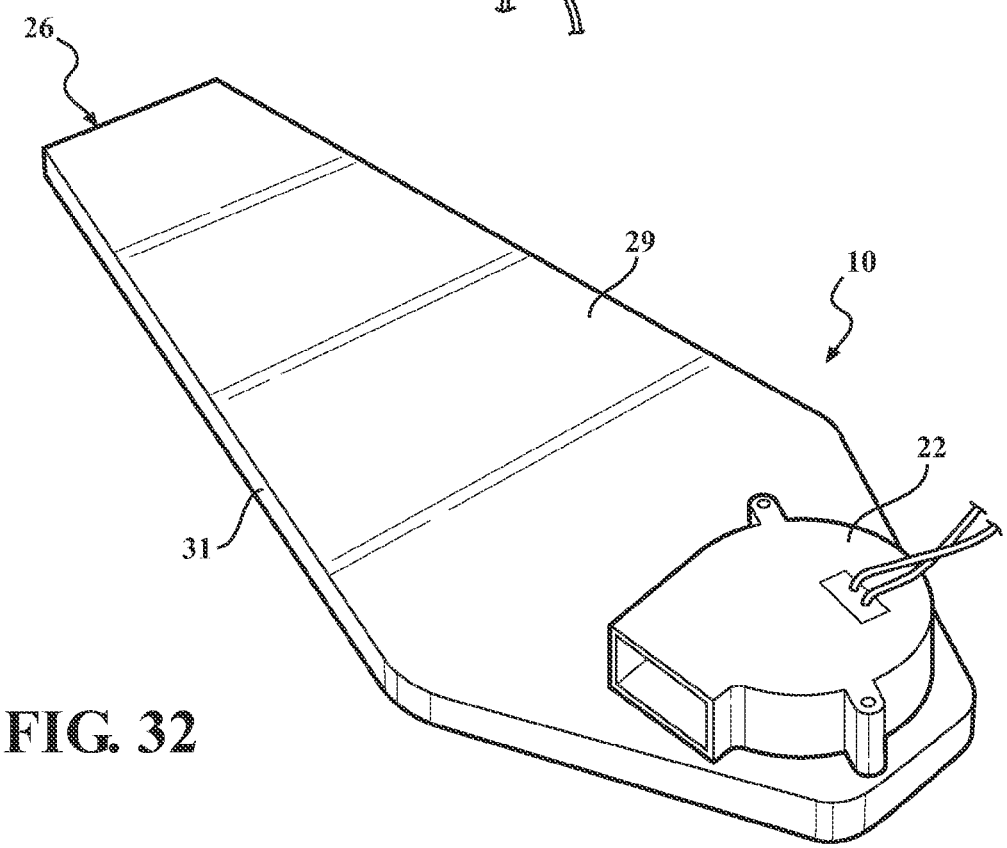
FIG. 32 is a perspective view of the opposite side of the air manifold of FIG. 31.
Figure 33:
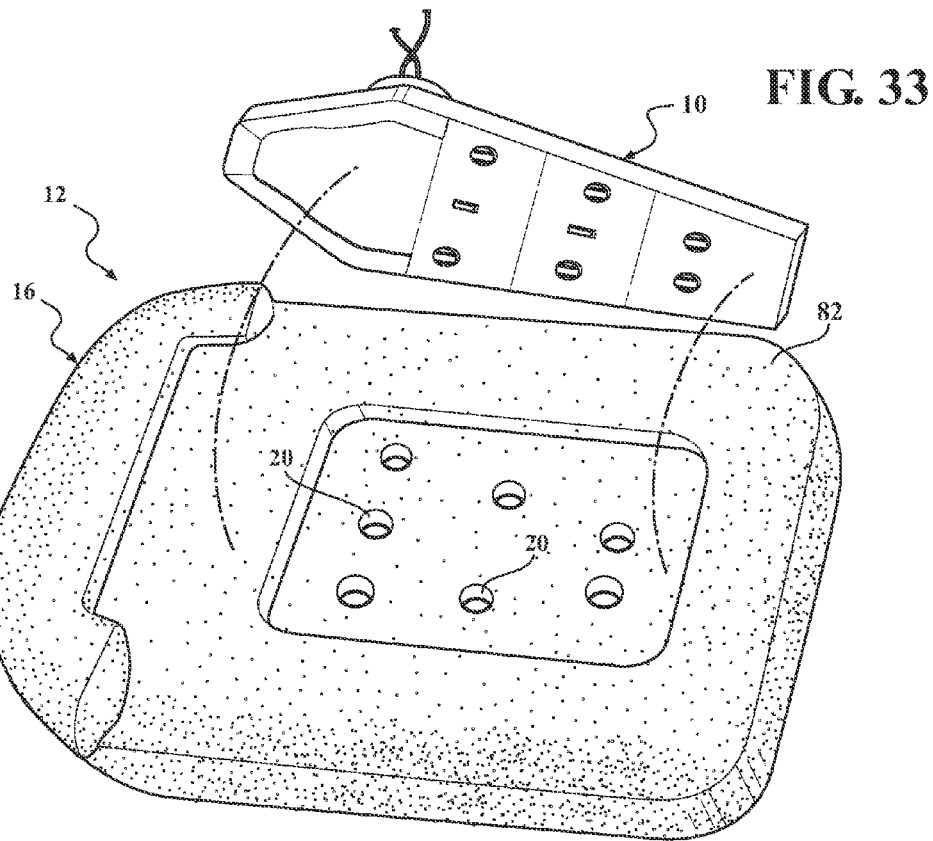
FIG. 33 is an exploded view of the air manifold of FIG. 31 and a seat cushion.
Figure 34:
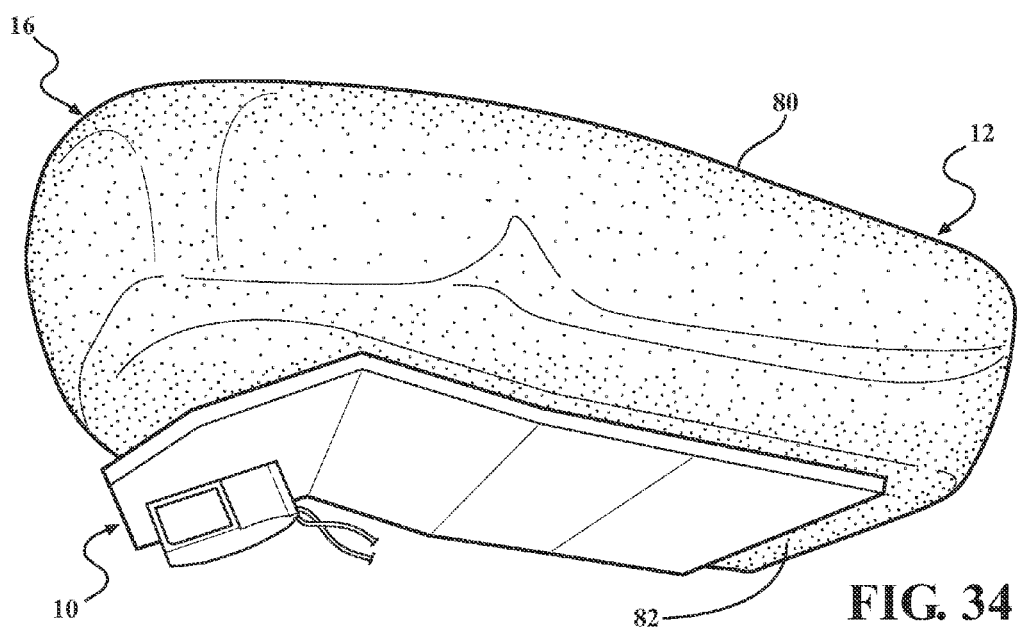
FIG. 34 is a perspective view of the air manifold of FIG. 31 mounted on a bottom surface of the seat cushion.

Turning to FIGS. 28-30, in another embodiment the air manifold 10 includes at least one primary section 76 having a sheet-like body 26 including first and second spaced, opposing walls 28, 29 and a sealed perimeter 31, a plurality of divider walls 30 connecting the first and second walls together and defining a plurality of air channels 32 within the body, and an opening in the body defining an air port 34 cooperable with an air mover 22 and in fluid communication with the air channels. The air manifold 10 also includes at least one secondary section 78 having a sheet-like body 26 including first and second spaced, opposing walls 28, 29 and a sealed perimeter 31, and a plurality of divider walls 30 connecting the first and second walls together and defining a plurality of air channels 32 within the body. The secondary section 78 is adjacent the primary section 76 and oriented such that the air channels 32 of the secondary section are disposed at an angle relative to the air channels 32 of the primary section. The air channels 32 of the secondary section 78 are in fluid communication with the air port 34 via the air channels 32 of the primary section 76. The air channels 32 of the two sandwiched sections 76, 78 are fluidly connected by air vents 38 in the adjacent surfaces of the sections. The secondary section 78 includes more, less, or an equal number of air channels 32 than the primary section 76. The secondary section 78 also includes a plurality of air vents 38 in the first wall 28 that are fluidly communicable with air passages 20 in a seat cushion element 16. The air manifold 10 is disposable between a seat cushion element 16 and a structural support of a seat 15 wherein the first wall 28 of the air manifold 10 faces a backside surface of the seat cushion element 16 such that the air vents 38 on the first wall 28 of the secondary section 78 are aligned with the air passages 20 in the seat cushion element 16. The flow of air through the seat cushion 16 and air manifold 10 is illustrated by arrows in the figures.

A ventilated occupant support 12 including the air manifold 10 is illustrated in FIGS. 31-34. The air manifold 10 includes a sheet-like body 26 having first and second spaced, opposing walls 28, 29 and a sealed perimeter 31. A plurality of divider walls 30 connect the first and second walls 28, 29 together and define a plurality of air channels 32 within the body 26. An opening in the second wall 29 of the body defines an air port (not visible) cooperable with an air mover 22. A plurality of air vents 38 are formed in the first wall 28.

The seat cushion 16 has an occupant facing side 80 and a rear side 82. The seat cushion 16 also includes a plurality of air passages 20 extending from the occupant facing side 80 to the rear side 82. Alternatively, the seat cushion 16 may be made of an air permeable material. The air manifold 10 is disposed on the seat cushion rear side 82 so that the first wall 28 of the air manifold 10 faces the backside surface 82 of the seat cushion element 16. In this disposition, the air vents 38 of the air manifold 10 are aligned with the air passages 20 of the seat cushion 16. Thus, the air mover 22 can deliver air to or draw air away from the occupant facing surface 80 of the seat cushion 16. The path for air flow runs from the occupant facing surface 80 through the air passages 20 into the air channels 32 of the manifold via the air vents 38, and through the air channels 32 to the air port 34, which is disposed in an open zone (not visible) of the air manifold 10.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. An air manifold for a ventilated occupant support, said air manifold comprising:
   a sheet-like body including first and second spaced, opposing walls and a sealed perimeter;
   a plurality of divider walls connecting said first and second walls together and defining a plurality of air channels within said body, said plurality of air channels including a plurality of said air channels that supply air and another plurality of said air channels that receive air;
   an opening in said body defining an air port cooperable with an air mover, said air port being in fluid communication with said air channels that receive air;
   a plurality of air vents in said first wall, each air vent being in fluid communication with at least one of said air channels that supply air;
   at least one zone disposed within a plurality of said air channels inside said body, said at least one zone being free of said divider walls, and each said at least one zone being in fluid communication with a plurality of said air channels that supply air to said air port and also being in fluid communication with another plurality of said air channels that receive air from said plurality of air vents, said at least one zone being disposed intermediate said air vents and said air port; and
   said air manifold being disposable between a seat cushion element and a structural support of a seat wherein said first wall of said air manifold faces a backside surface of said seat cushion element.

2. The air manifold of claim 1, wherein at least a group of said air channels are generally parallel and adjacent to each other.

3. The air manifold of claim 1, wherein said zone is generally a strip disposed along the perimeter of said body.

4. The air manifold of claim 3, wherein said zone is disposed along at least a majority of one side of the perimeter of said body.

5. The air manifold of claim 1, wherein said zone is in fluid communication with at least a majority of said air channels.

6. The air manifold of claim 1, wherein said zone is oriented generally transverse to said air channels.

7. The air manifold of claim 6, wherein said zone is contiguous with one of said air port and one or more of said air vents.

8. The air manifold of claim 1, wherein one or more of said zone, said air vents, and said air port are each formed by a cutout through the entire manifold in a thickness direction that is covered by an impermeable patch on at least one of said first and second walls.

9. The air manifold of claim 1, wherein said vents are generally alignable with through passages in said seat cushion element.

10. The air manifold of claim 1, wherein said vents are generally arranged in a linear pattern.

11. The air manifold of claim 1, including an air mover in fluid communication with said air port.

12. The air manifold of claim 11, wherein said air mover includes a housing cooperable with said air port, said air mover housing being received in said air port.

13. An air manifold for a ventilated occupant support, said air manifold comprising:
    a sheet-like body including first and second spaced, opposing walls and a sealed perimeter;
    a plurality of divider walls connecting said first and second walls together and defining a plurality of air channels within said body;
    an opening in said body defining an air port cooperable with an air mover, said air port being in fluid communication with said air channels;
    at least one zone inside said body that is free of said divider walls, a group of said air channels being in fluid communication with each other through one said zone; and
    a plurality of air vents in said first wall, each air vent being in fluid communication with at least one of said air channels;
    said air manifold being disposable between a seat cushion element and a structural support of a seat wherein said first wall of said air manifold faces a backside surface of said seat cushion element;
    wherein a greater number of air channels are in fluid communication with one said air vent that is distal from said air port than another said air vent that is proximate said air port.

* * * * *